United States Patent [19]

Jordan

[11] 3,810,113

[45] May 7, 1974

[54] DIGITAL DATA PROCESSING APPARATUS

[75] Inventor: James Redmon Jordan, Fife, England

[73] Assignee: National Research Development Corporation, London, England

[22] Filed: Aug. 17, 1972

[21] Appl. No.: 281,273

[30] Foreign Application Priority Data

Aug. 27, 1971 Great Britain .................... 40295/71

[52] U.S. Cl. ............. 340/172.5, 340/146.2, 235/92, 235/181, 73/194, 324/71

[51] Int. Cl. .......................... G01f 1/100, G06f 7/02

[58] Field of Search ...................... 340/172.5, 146.2; 235/92 CP, 92 T, 92 CA, 92 DP, 92 SH, 181, 92 MS, 92 PB; 328/55, 109, 110, 129; 73/28, 194 F; 324/71

[56] References Cited

UNITED STATES PATENTS 3,346,844 10/1967 Scott et al. ....................... 340/172.5

3,611,309 10/1971 Zingg ............................. 340/172.5

*Primary Examiner*—Paul J. Henon

*Assistant Examiner*—John P. Vandenburg

*Attorney, Agent, or Firm*—Cushman, Darby & Cushman

[57] ABSTRACT

A computing apparatus comprises a set of counters corresponding to different stages of a shift register having a serial input. A binary signal is applied to this input, and the inputs of the counters are gated so that each counts only when the state of the corresponding stage satisfies a particular condition, for example coincidence with the current state of another binary signal. Once the count for any counter has reached a given value a signal is generated indicating for which of the counters this has occurred. A principal use is for identifying the time delay between two related noise signals.

24 Claims, 5 Drawing Figures

PATENTED MAY 7 1974

3,810,113

SHEET 2 OF 3

DIGITAL DATA PROCESSING APPARATUS

This invention relates to digital data processing apparatus and has as one object the provision of such an apparatus suitable for performing various computations of a statistical nature, and especially computations relating to the cross-correlation of two signals.

According to the invention a digital data processing apparatus comprises a binary shift register having a serial input, a set of counters respectively corresponding to different stages of the shift register, gating means operative to cause each counter to count out of a sequence of successive occasions only those occasions on which there occurs in respect of the corresponding stage a given condition whose occurrence or non-occurrence on each of said occasions is dependent on the state of the stage on that occasion, and signalling means operative in response to the reaching of a given value by the count for any of the stages to generate at least one signal whose form indicates the ordinal number of at least one stage for which the count has reached said given value.

By applying appropriate input signals to such an apparatus it can be arranged that the counts for the various stages in respect of a particular sequence of occasions will correspond respectively to the values of some statistical function $U(x)$ for a series of discrete values of the variable $x$, so that as the counts build up the operation of the signalling means will enable that value of $x$ for which $U(x)$ has its maximum value to be identified.

A particularly important application envisaged for such an apparatus is its use for the identification of the time delay between two related noise signals. A requirement for this arises in connection with certain known methods of flow measurement, for example as disclosed in British Pat. Specification No. 1235856. In these methods use is made of the fact that turbulence in a flowing fluid gives rise to random fluctuations in the value of certain parameters such as the density of the fluid or the concentration of particles entrained in the fluid; the fluctuations are sensed at two points spaced apart by a known distance along the flow path by means of transducers providing electrical output signals, and the flow velocity is deduced by determining the time delay between the signals from the two transducers, which corresponds to the transit time of the turbulence patterns over the known distance.

One arrangement in accordance with the invention will now be described by way of example with reference to an apparatus suitable for the purpose indicated in the preceding paragraph, but also capable of being used for other purposes. In the description reference will be made to the accompanying drawings, in which.

In principle the determination of the time delay between two signals A(t) and B(t) by cross-correlation requires computation of the function $$C(y)=\frac{1}{T}\int_0^T A(t)B(t-y)dt$$

for all possible values of the delay parameter $y$, and the identification of that value of $y$ for which the function C(y) has its maximum value. In the apparatus to be described this procedure is simplified in various ways which enable it to be mechanised in a wholly digital fashion. Firstly, instead of computing the function C(y) use is made of the polarity form given by the expression $$\frac{1}{T}\int_0^T \frac{A(t)}{|A(t)|}\,\frac{B(t-y)}{|B(t-y)|}\,dt.$$

Secondly, instead of performing a true integration, use is made of numerical counting in conjunction with sampling of the signals at discrete intervals. Thirdly, the count is evaluated only for a series of discrete values of the parameter $y$. It will be appreciated that these simplifications result in some degree of approximation in the determination of the time delay, but in general this approximation is of an acceptable order.

Figure 1:
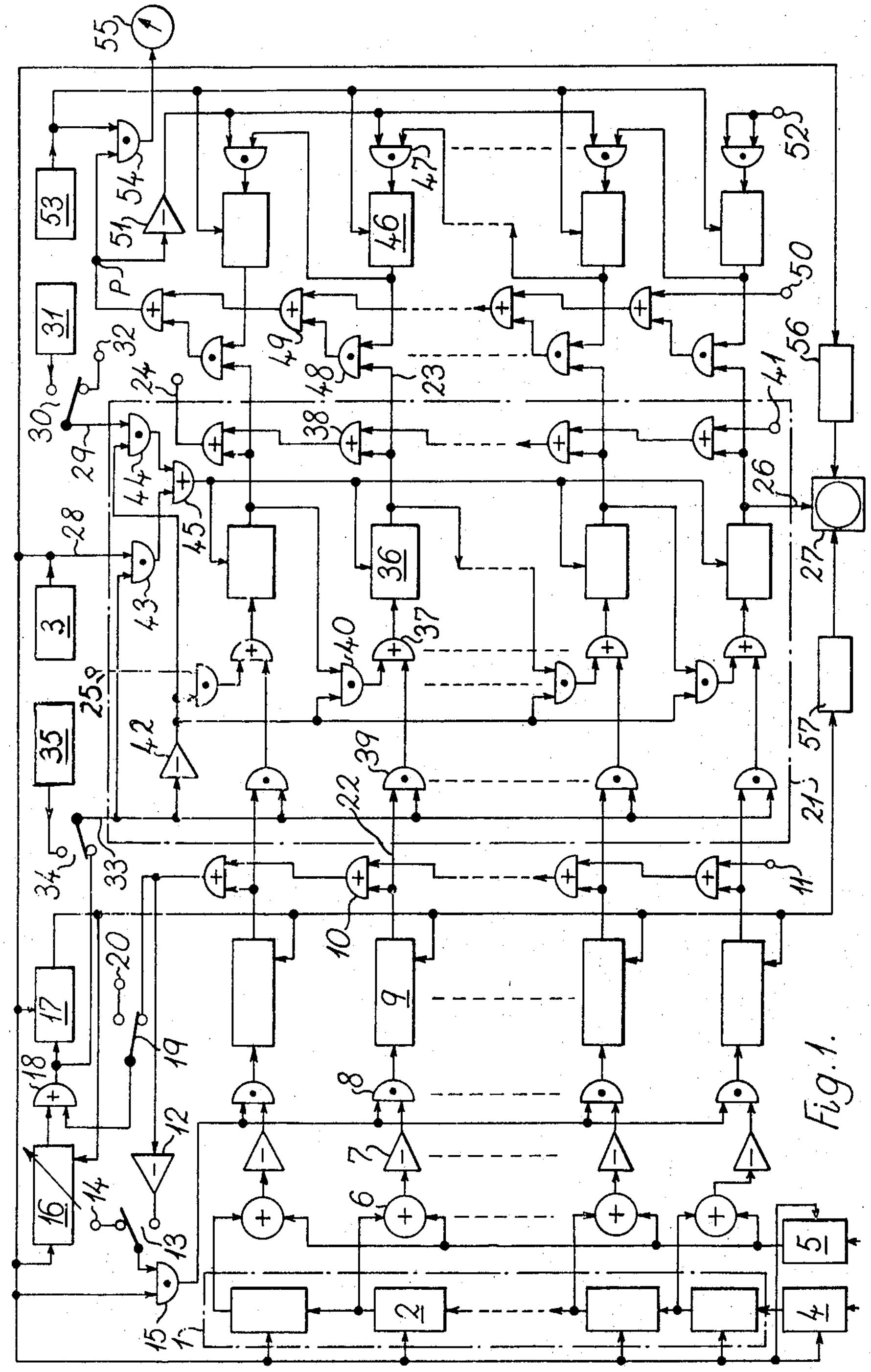
FIG. 1 is a functional diagram of the apparatus.

Referring now to FIG. 1, the apparatus includes a binary shift register 1 consisting of a large number (R) of identical binary storage stages 2 connected in series; for convenience only the first, second, (R−1)th and Rth of the stages 2 are shown in the drawing. Each storage stage 2 has a control terminal to which pulses are applied in operation, and is operative so that changes of stage of its output (between logic 0 and 1 in either sense) occur only at the ends of these pulses, the state assumed by the output of the stage at the end of each pulse being the same as the state of the input of the stage at the beginning of that pulse; such a storage stage may for example conveniently be constituted by a "master - slave" JK flip-flop. A train of clock pulses derived from a generator 3 having a frequency of F pulses per second is applied to the control terminals of all the stages 2 and the input of the first of the stages 2 is connected to the output of a polarity sampler 4 to the input of which is applied the leading one of two noise signals to be compared; the lagging one of these signals is applied to the input of an identical polarity sampler 5. Each polarity sampler 4 or 5 is operative, under the control of the clock pulses, to provide a binary signal whose state will change at the end of a clock pulse if, and only if, the polarity of the relevant noise signal at the beginning of that clock pulse is different from its polarity at the beginning of the previous clock pulse; the samplers 4 and 5 may for example each consist of a simple polarity detector followed by a binary storage stage similar to the stages 2. It will be appreciated that, provided the value of F is sufficiently high, the output of each sampler 4 or 5 will approximate to a binary signal which changes its stage whenever the polarity of the relevant noise signal changes, and that the outputs of the successive stages 2 of the register 1 will be in the form of a series of increasingly delayed versions of the output of the sampler 4, the value of the delay for the rth of the stages 2 being equal to $r$/F seconds. The value of F is chosen, having regard to the value of R, so that the delay for the last stage 2 of the register 1 exceeds the maximum anticipated value of the time delay to be identified; in the case of flow measurement this will of course correspond to the minimum expected flow rate.

Each stage 2 of the register 1 has associated with it a channel comprising an EXCLUSIVE OR gate 6, an inverter 7, an AND gate 8 and a pulse counter 9, all of the channels being identical. In each channel the output from the relevant stage 2 is applied to one input of the gate 6, to the other input of which is applied the output from the sampler 5; the output of the gate 6 is applied to the inverter 7, the output from which is applied to one input of the gate 8, and the output of the gate 8 is applied to the input of the counter 9. Each counter 9 has a counting capacity of N and is operative so that, starting from a condition of zero count, its output will be in the logic 0 state until the end of the Nth pulse applied to its input, when the output will change to the logic 1 state and will remain in this state until the zero count condition is restored by the application of a logic 1 signal to the reset terminal of the counter; the condition of a counter 9 when its output is in the logic 1 state will subsequently be referred to as the overload condition. The outputs of the counters 9 are respectively applied to inputs of a chain of OR gates 10, the second input of each gate 10 except the first in the chain having applied to it the output of the preceding gate 10 in the chain; the second input of the first gate 10 in the chain is connected to a terminal 11 to which a continuous logic 0 signal is applied, and the output of the last gate 10 in the chain is applied to an inverter 12 the output of which is connected to one fixed contact of a two-way switch 13, the other fixed contact of the switch 13 being connected to a terminal 14 to which a continuous logic 1 signal is applied. The movable contact of the switch 13 is connected to one input of an AND gate 15, to the other input of which the clock pulses are applied, the output of the gate 15 being applied to the second inputs of all the gates 8. It will thus be seen that the clock pulses will be applied to the second inputs of all the gates 8 if either the switch 13 is in the state shown in the drawing or the switch 13 is in its alternative state and none of the counters 9 is in the overload condition.

As a result in either of these cases the output of each gate 8 consists of a series of pulses occurring whenever, on the occasion of a clock pulse, there is a coincidence between the current state of the output of the sampler 5 and the state of the output of the sampler 4 at some instant earlier in time by an amount equal to the delay corresponding to the stage 2 with which the relevant gate 8 is associated; each such series of pulses is counted by the corresponding counter 9. Thus, starting from a condition of zero count in all the counters 9, after the occurence of X clock pulses the numbers registered in the respective counters 9 (assuming that none of them has gone into the overload condition) will be approximately related to the values of the polarity correlation function $$\frac{1}{T}\int_0^T \frac{A(t)}{|A(t)|}\,\frac{B(t-y)}{|B(t-y)|}\,dt$$

for a series of value of $y$ (respectively equal to the first R integral multiples of 1/F seconds), where T is equal to X/F seconds and A(t) and B(t) are respectively the lagging and leading noise signals; the approximation will improve as X, and hence, T, increases. It should be noted that a number Y registered in one of the counters 9 corresponds to a value of the correlation co-efficient equal to 2(Y/X)−1; in particular values of Y equal to O, X/2 and X respectively correspond to values of the correlation co-efficient of −1, 0 and 1. If the number of pulses applied to the rth one of the counters 9 reaches N after the occurrence of Z clock pulses, the resulting overload condition of that counter will indicate (for an integrating time T equal to Z/F seconds) that the value of the correlation co-efficient is 2(N/Z)−1 for a time delay equal to r/F seconds; it will be appreciated that the minimum possible value of Z is equal to N.

As will be explained more fully below, in one mode of operation (subsequently referred to as Mode I) the apparatus is arranged automatically to identify for which of the counters 9 the overload condition first occurs, and hence the value of the delay for which the correlation function has its maximum value, while in a second mode of operation (subsequently referred to as Mode II) the apparatus is arranged to provide additional information concerning the correlation function by means of a pictorial display based on the successive sets of states of the outputs of the counters 9 arising from a succession of clock pulses. For both Mode I and Mode II the apparatus is arranged to operate in repeated cycles, in order to provide repeatedly updated information concerning either the time delay or the correlation function generally. The length of the cycles is determined by the following considerations. Obviously each cycle must comprise at least N clock pulses otherwise none of the counters 9 can go into the overload condition. This determines the minimum value of the integrating time for each cycle, and in order to obtain accurate results when operating in Mode I this should be made many times the maximum expected delay; in other words N should be many times R. When operating in Mode I the maximum value of the integrating time for each cycle should not be allowed greatly to exceed the minimum, in order to ensure that the appearance of an overload condition for one of the counters 9 shall be of sufficient statistical significance; more specifically, if the detection of a peak in the correlation function is regarded as having sufficient significance only if the corresponding value of the correlation co-efficient is not less than S, the maximum number of clock pulses per cycle must be made equal to 2N/(S+1). This expression may also be used to determine the number of clock pulses per cycle for operation in Mode II, if S is taken as the minimum value of the correlation co-efficient for which information is required. For Mode I operation S will always be positive and thus the maximum number of clock pulses per cycle will always be less than 2N; for Mode II operation S may in some cases be negative, giving rise to a requirement for a larger number of clock pulses per cycle.

Figure 3:
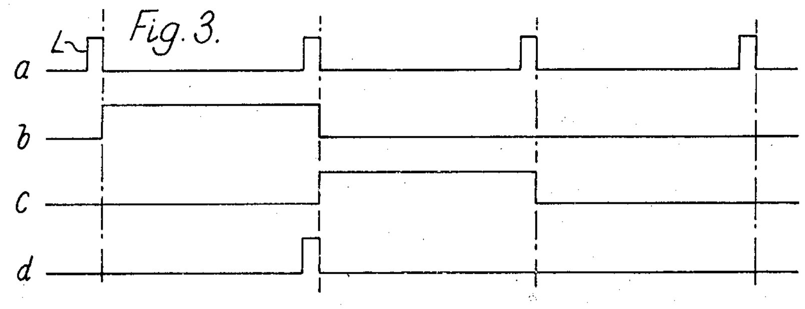
FIGS. 3, 4 and 5 are explanatory diagrams.

To effect the cyclic operation there is provided a control circuit incorporating a timing counter 16 to the input of which the clock pulses are applied, the counter 16 being of similar form to the counters 9 but having a variable counting capacity M which is set to the value 2N/(S+1) for a desired value of S. The control circuit further incorporates a binary storage stage 17 similar to the stages 2, the output of which is applied to the reset terminals of all the counters 9 and the counter 16. To the input of the stage 17 is applied the output of an OR gate 18, to one input of which is applied the output of the counter 16 and to the other input of which there is applied, via a two-way switch 19, either the output of the last gate 10 in the chain of OR gates or a continuous logic 0 signal appearing at a terminal 20. The operation of the control circuit is illustrated by FIG. 3, in which the traces (a), (b) and (c) respectively represent the signals appearing at the outputs of the generator 3, the gate 18 and the stage 17 at the end of one cycle of operation and the beginning of the next, the clock pulse L being the last one of the earlier of these cycles. With the switch 19 in the state shown in the drawing the pulse L will be that one which first gives rise to an overload condition in one of the counters 9 and/or in the counter 16, while with the switch 19 in its alternative state the pulse L will be that one which gives rise to an overload condition in the counter 16. In either case, at the end of the pulse L the output of the gate 18 will assume the logic 1 state, so that at the end of the next clock pulse the output of the stage 17 will assume the logic 1 state, thereby causing all the counters 9 and the counter 16 to be reset to zero. This will in turn cause the output of the gate 18 to revert to the logic 0 state, in which it will remain until the end of the next cycle, so that at the end of the second clock pulse after the pulse L the output of the stage 17 will also revert to the logic 0 state. The third clock pulse after the pulse L will thus be the first one of the new cycle, the first and second clock pulses after the pulse L being intercylic pulses.

For operation in Mode I, either the switches 13 and 19 are set in the states shown in the drawing, when the apparatus will operate in an asynchronous manner with a cycle of variable length, each cycle being terminated as soon as any of the counters 9 or the counter 16 goes into the overload condition, or the switches 13 and 19 are both set in their alternative states, when the apparatus will operate in a synchronous manner with a cycle of fixed length, each cycle being terminated only when the counter 16 goes into the overload condition; in the latter case when any of the counters 9 goes into the overload condition the output of the inverter 12 will assume the logic 0 state, so that for the remainder of the relevant cycle the application of further pulses to the inputs of the counters 9 will be inhibited and no more of the counters 9 can go into the overload condition. In either case the effective integrating time for each cycle will vary between N/F and M/F seconds, according to how quickly an overload condition occurs in one of the counters 9, and the occurrence of an overload condition in the counter 16 before any of the counters 9 has gone into an overload condition will correspond to a cycle in which no significant correlation between the noise signals occurs. For operation in Mode II, the switch 13 is set in the state shown in the drawing and the switch 19 is set in its alternative state. The apparatus will thus operate in the synchronous manner, but in this case pulses can be applied to the inputs of all the counters 9 throughout each cycle so that as the cycle proceeds an increasing number of the counters 9 go into the overload condition. This can be better understood by consideration of the simplified example illustrated by Table I below, which shows for a hypothetical correlation function the successive sets of states of the outputs of the counters 9 at the ends of a sequence of clock pulses in one cycle, R being assumed to have the value 20.

TABLE I

| Clock Pulse No. | States of outputs of counters 9 |
|---|---|
| $n$ | 0 0 0 0 0 0 0 0 0 0 0 0 0 0 0 0 0 0 0 0 |
| $n+1$ | 0 0 0 0 0 0 0 1 0 0 0 0 0 0 0 0 0 0 0 0 |
| $n+2$ | 0 0 0 0 0 0 1 1 1 0 0 0 0 0 0 0 0 0 0 0 |
| $n+3$ | 0 0 0 0 1 1 1 1 1 1 0 0 0 0 0 0 0 0 0 0 |
| $n+4$ | 0 0 0 1 1 1 1 1 1 1 1 0 0 0 0 0 1 0 0 0 |
| $n+5$ | 0 0 1 1 1 1 1 1 1 1 1 1 1 0 0 1 1 1 0 0 |
| $n+6$ | 1 1 1 1 1 1 1 1 1 1 1 1 1 1 1 1 1 1 1 0 |
| $n+7$ | 1 1 1 1 1 1 1 1 1 1 1 1 1 1 1 1 1 1 1 1 |

It will be appreciated that the upper edge of the pattern of ones in Table I corresponds approximately to the shape of the correlation function, so that a display based on the array of states shown in Table I will readily enable the correlation function to be visualised.

The apparatus further includes a pattern register 21 which is arranged to store temporarily the set of states of the outputs of the counters 9, the register 21 being addressed once per cycle for Mode I operation and once per clock pulse for Mode II operation. The register 21 has a set of R parallel input lines 22 to which are respectively applied the outputs of the counters 9, and a corresponding set of R parallel output lines 23 connected, as described more fully below, to a circuit which is operative, when the apparatus is operating in Mode I, to give an indication dependent on the delay between the two noise signals. The register 21 also has a common output line 24, a serial input line 25 and a serial output line 26 connected, as described more fully below, to a cathode ray oscilloscope 27 which is operative to provide the display when the apparatus is operating in Mode II. The register 21 further has a clock pulse line 28 connected to the output of the generator 3, a shift pulse line 29 which is connectable via a two-way switch 30 either to the output of a pulse generator 31 (which will be described more fully below) or to a terminal 32 to which a continuous logic 0 signal is applied, and a mode control line 33 which is connectable via a two-way switch 34 either to the output of a pulse generator 35 (which will be described more fully below) or to the output of the gate 18; for Mode I operation the switches 30 and 34 are set in the states shown in the drawing, while for Mode II operation they are both set in their alternative states.

The register 21 comprises a set of R binary storage stages 36 similar to, and respectively corresponding to, the stages 2. Each stage 36 has associated with it two OR gates 37 and 38 and two AND gates 39 and 40. For each of the stages 36, the output of the associated gate 37 is applied to the input of the stage 36, and the output of the stage 36 is applied to one input of the associated gate 38 and a corresponding one of the lines 23. The second inputs of the gates 38 and the outputs of these gates are arranged so that the gates 38 are connected in a chain, similar to the chain of gates 10, between the line 24 and a terminal 21 to which a continuous logic 0 signal is applied. To the inputs of each gate 37 are respectively applied the outputs of the associated gates 39 and 40, one input of the gate 39 being connected to a corresponding one of the lines 22 and the other input of the gate 39 being connected to the line 33. The line 33 is also connected to the input of an inverter 42, the output of which is applied to one input of each of the gates 40. The second input of that gate 40 associated with the last of the stages 36 is connected to the line 25, while for each of the other gates 40 the second input has applied to it the output of that stage 36 next in order above the stage 36 with which that gate 40 is associated. It will thus be seen that with a logic 1 signal applied to the line 33 the outputs of the counters 9 will be respectively applied to the inputs of the stages 36, while with a logic 0 signal applied to the line 33 the stages 36 will be connected in series between the lines 25 and 26, in the reverse order to that for the stages 2. In the latter state, the stages 36 thus constitute a shift register which may be operated by the application of pulses to the control terminals of all the stages 36, and whose output will appear on the line 26. The line 25 may either have applied to it a continuous logic 0 signal, so that the application of a sufficient number of pulses to the control terminals of the stages 36 will clear the shift register, or may be connected to the line 26 so that the contents of the shift register are restored to their original state after the application of R pulses to the control terminals of the stages 36.

The register 21 further comprises two AND gates 43 and 44 and an OR gate 45. The inputs of the gate 43 are respectively connected to lines 28 and 33 and the inputs of the gate 44 are respectively connected to the line 29 and the output of the inverter 42; the outputs of the gates 43 and 44 are respectively applied to the inputs of the gate 45, the output of which is applied to the control terminals of all the stages 36. It will thus be seen that with a logic 1 signal applied to the line 33 the output of the generator 3 will be applied to the control terminals of all the stages 36, while with a logic 0 signal applied to the line 33 the signal appearing on the line 29 will be applied to the control terminals of all the stages 36.

When the apparatus is operating in Mode I, the signal applied to the line 33 will have the form represented by the trace (b) in FIG. 3, so that the register 21 will be addressed by the outputs of the counters 9 only during a short period immediately following the end of each cycle. Further, since a continuous logic 0 signal is applied to the line 29, the output of the gate 45 will be as represented by the trace (*d*) in FIG. 3, consisting of one pulse (the first intercyclic clock pulse) per cycle. Accordingly, the respective states of the outputs of the stages 36 throughout any given cycle will correspond with the respective states of the outputs of the counters 9 at the end of the preceding cycle, so that throughout the given cycle the register 21 will store information concerning the position of any significant peak in the correlation function detected during the preceding cycle. It will be appreciated that during any given cycle the state of the signal appearing on the line 24 will be logic 1 or 0 according to whether or not a significant peak has been detected during the preceding cycle. This signal can therefore be used for various indication or control purposes. For example in the case where the apparatus is used for flow measurement, the absence of the detection of a significant peak in the correlation function may result from reversal of the flow direction; this contingency can be catered for by arranging for the connections between the transducers (not shown) from which the noise signals are derived and the polarity samplers 4 and 5 to be automatically interchanged if a given number of cycles occur during which the signal appearing on the line 24 is in the logic 0 state.

When the apparatus is operating in Mode I, the operation of the delay indicating circuit during each cycle is controlled by the peak position information stored in the register 21 during that cycle. The delay indicating circuit comprises a set of R binary storage stages 46 similar to, and respectively corresponding to, the stages 2. Each stage 46 has associated with it two AND gates 47 and 48 and an OR gate 49. For each of the stages 46, the output of the associated gate 47 is applied to the input of the stage 46, and the output of the stage 46 is applied to one input of the associated gate 48, the other input of which is connected to a corresponding one of the lines 23. The output of each gate 48 is applied to one input of the associated gate 49, the second inputs of the gates 49 and the outputs of these gates being arranged so that the gates 49 are connected in a chain similar to the chain of gates 10, between a point P and a terminal 50 to which a continuous logic 0 signal is applied. For each of the gates 47 except that associated with the first of the stages 46, one input has applied to it the output of an inverter 51 whose input is connected to the point P, while the other input has applied to it the output of that stage 46 next in order below the stage 46 with which the relevant gate 47 is associated; both inputs of the gate 47 associated with the first of the stages 46 are connected to a terminal 52 to which a continuous logic 1 signal is applied. A train of pulses derived from a generator 53 having a frequency G pulses per second is applied to the control terminals of all the stages 46 and is also applied to one input of an AND gate 54 the other input of which is connected to the point P.

The operation of the circuit for each cycle is as follows. Firstly, if each of the signals appearing on the lines 23 is in the logic 0 state, the signal appearing at the point P will be continuously in the logic 0 state and hence none of the pulses from the generator 53 will appear at the output of the gate 54. If the signal appearing on the first of the lines 23 is in the logic 1 state, the signal appearing at the point P will be continuously in the logic 1 state since the output of the first of the stages 46 is continuously in the logic 1 state, and hence all the pulses from the generator 53 will appear at the output of the gate 54. In any other case, the signal appearing at the point P will alternate between the logic 0 and logic 1 states. While the signal appearing at the point P is in the logic 0 state, the second to Rth of the stages 46 effectively constitute a shift register operated by the pulses from the generator 53, the input to the shift register being a continuous logic 1 signal. For this state of the signal appearing at the point P, starting from a condition in which the outputs of all the stages of this shift register are in the logic 0 state, these outputs will in turn assume the logic 1 state, in a sequence starting with the second of the stages 46, at the ends of successive pulses from the generator 53. The sequence will continue until a logic 1 state appears at the output of the lowest in order of the stages 46 constituting the shift register for which a logic 1 state exists on the corresponding line 23, at which point the signal appearing at the point P will assume the logic 1 state. At the end of the next pulse from the generator 53 the outputs of all the stages 46 constituting the shift register, and hence also the signal appearing at the point P, will revert to the logic 0 condition, thereby causing the sequence to recur. If the relevant one of the lines 23 is the rth one, the signal appearing at the point P will be in the logic 1 state for periods of 1/G seconds recurring with a frequency of G/r periods per second, so that every rth one of the pulses from the generator 53 will appear at the output of the gate 54.

Figure 4:
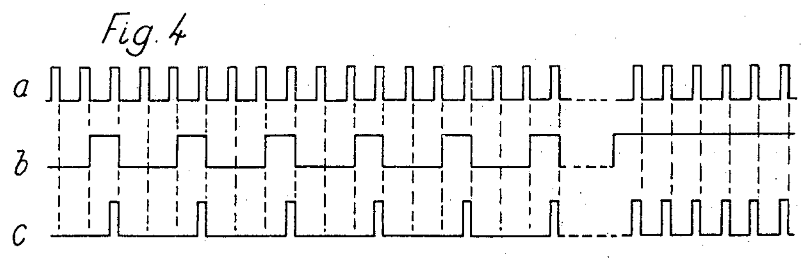

Thus when a significant peak in the correlation function has been detected in any given cycle, and the position of this peak corresponds to a time delay of r/F seconds between the noise signals, the signal appearing at the output of the gate 54 throughout the next cycle will consist of a train of pulses of frequency G/r pulses per second. This is illustrated in FIG. 4, in which the traces (*a*), (*b*) and (*c*) respectively represent the signals appearing at the output of the generator 53, the point P and the output of the gate 54, the lefthand side of the diagram corresponding to a case in which the value of *r* is three and the righthand side of the diagram corresponding to a case in which the value of *r* is one. The signal at the output of the gate 54 is fed to a conventional frequency meter 55, which thus gives an indication inversely proportional to the time delay, and hence in the case of flow measurement directly proportional to the flow velocity. The form of the signal also lends itself readily to combination with signals representing other variables; for example in the case of flow measurement it may be required to compute the mass flow rate, in which case the density of the flowing material must also be taken into account. It will be appreciated that the mean value of the signal appearing at the point P when a significant peak has been detected will be inversely proportional to the relevant time delay, and hence this signal could also be used to provide an indication.

It should be noted that if the true value of the time delay (D seconds) is equal to one of the true values equal to the integral multiples of 1/F seconds, the indication given by the meter 55 will be proportional to G/FD. The calibration of the meter 55 will therefore be liable to vary unless both G and F are kept substantially constant or the ratio G/F is maintained constant; the latter alternative may conveniently be adopted, thereby avoiding the need to use very stable pulse generators, by arranging for the generator 3 to be constituted by a frequency divider to which the output of the generator 53 is applied. It should further be noted that where the true value of the time delay lies approximately midway between two adjacent ones of the quantized values the corresponding two of the counters 9 may go into the overload condition simultaneously in one cycle. In this case, the frequency of the signal appearing at the output of the gate 54 will always correspond to the lower of the two quantized values of the time delay. When the apparatus is used for flow measurement, the maximum error (E) of the indicated velocity (V) due to the quantization of the time delay is given approximately by the equation E = V/r, where the time delay corresponding to V is r/F seconds. It will normally be required that the maximum fractional error given by the ratio E/V shall not exceed a given value (Q) over a range of flow velocities. If the ratio of the maximum and minimum velocities of the range is equal to W, it can readily be shown that to meet this requirement the value of R must not be less than W/Q; for example if W has a value of three and Q has a value of 2.5% the value of R must be at least 120.

Turning now to the use of the pattern register 21 when the apparatus is operating in Mode II, for which it will be recalled that the switches 30 and 34 are set in the states alternative to those shown in the drawing, the generator 31 is arranged to generate a train of shift pulses having a repetition frequency somewhat greater than RF pulses per second, while the generator 35 is arranged to generate a train of pulses synchronous with the clock pulses but each starting before and ending after the corresponding clock pulse, the arrangement being such that R of the shift pulses occur during each interval between the pulses from the generator 35. Thus, during each of the pulses from the generator 35 the register 21 will be addressed by the outputs of the counters 9, and only the corresponding clock pulse will be applied to the control terminals of the stages 36; at the end of each clock pulse the output of each of the stages 36 will therefore assume the same state as that of the output of the corresponding one of the counters 9 at the end of the preceding clock pulse. During each interval between the pulses from the generator 35, R shift pulses will be applied to the control terminals of all the stages 36. During each interval between successive clock pulses the signal appearing on the line 26 will therefore go through a succession of (R + 1) states, the first R of which correspond respectively to the states of the outputs of the stages 36 at the end of the earlier of the clock pulses, in a sequence corresponding to the order of the stages 36; the last state of the succession will be the same as the first if the line 25 is connected to the line 26, and will always be a logic 0 state if a continuous logic 0 signal is applied to the line 25.

Figure 5:
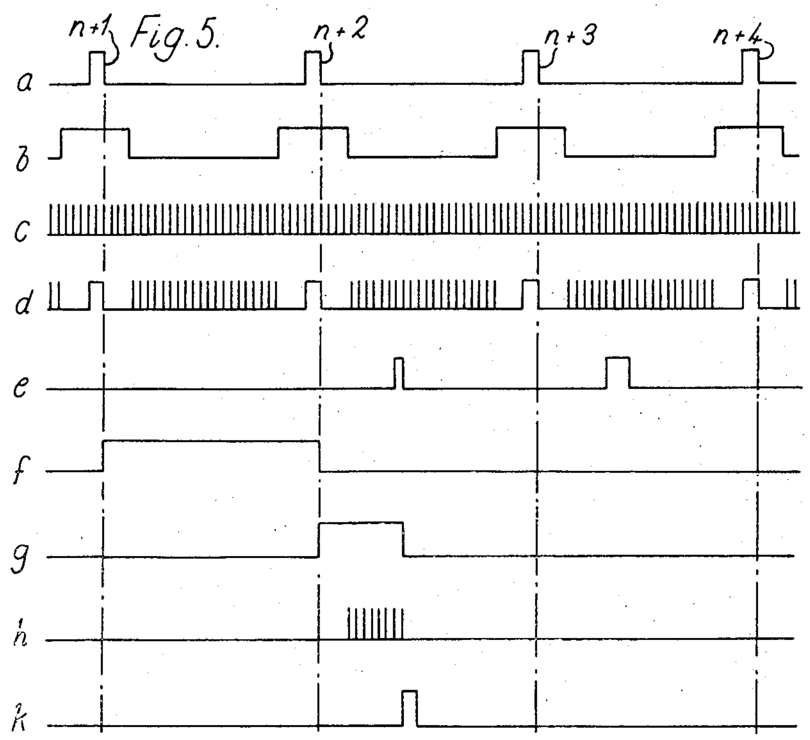

The operation is illustrated by FIG. 5, in which the traces (*a*), (*b*), (*c*), (*d*) and (*e*) respectively represent the signals appearing at the output of the generator 3, at the output of the generator 35, at the output of the generator 31, at the output of the gate 45 and on the line 26 for a case corresponding to the example of Table I; for convenience, the shift pulses are represented simply by single lines. As will be seen, in the interval between the clock pulses ($n+1$) and ($n+2$) the signal appearing on the line 26 will be continuously in the logic 0 state, in the interval between the clock pulses ($n+2$) and ($n+3$) the signal appearing on the line 26 will be in the logic 1 state from the end of the seventh shift pulse to the end of the eighth shift pulse and will otherwise be in the logic 0 state, in the interval between the clock pulses ($n+3$) and ($n+4$) the signal appearing on the line 26 will be in the logic 1 state from the end of the sixth shift pulse to the end of the ninth shift pulse and will otherwise be in the logic 0 state, and so on.

The signals appearing on the line 26 are applied to the electron gun of the cathode ray tube in the oscilloscope 27, which should either be of the storage type or have a long persistence screen, so that the electron beam in the tube is on or off according to whether the signal is in the logic 1 or logic 0 state. The oscilloscope 27 has associated horizontal and vertical scanning generators 56 and 57, the generator 56 being operative to deflect the electron beam horizontally across the width of the screen of the tube once during each interval between clock pulses, and the generator 57 being operative to deflect the beam downwards over the height of the screen once per cycle of the operation of the apparatus; the generator 56 is triggered by the clock pulses, while the generator 57 is triggered by the output of the stage 17, but is operative so that the scan does not commence until just before the Nth clock pulse of each cycle. Thus for any clock pulse at the end of which the output of one or more of the stages 36 is in the logic 1 state, there will appear on the screen, at a vertical level corresponding to that clock pulse, one or more bright horizontal traces corresponding in position to the relevant stage or stages 36. The upper boundary of the illuminated portion of the screen will thus correspond in shape to the correlation function. It should be noted that if the vertical scan is linear the picture of the correlation function will be distorted by virtue of the inverse relationship quoted above between the value of the correlation co-efficient and the corresponding clock pulse number Z. This will be of little consequence if the display facility is used merely to monitor the operation of the apparatus as a time delay identifier, but if a more accurate picture of the correlation function is required this can readily be arranged by using an appropriately non-linear vertical scan.

Figure 2:
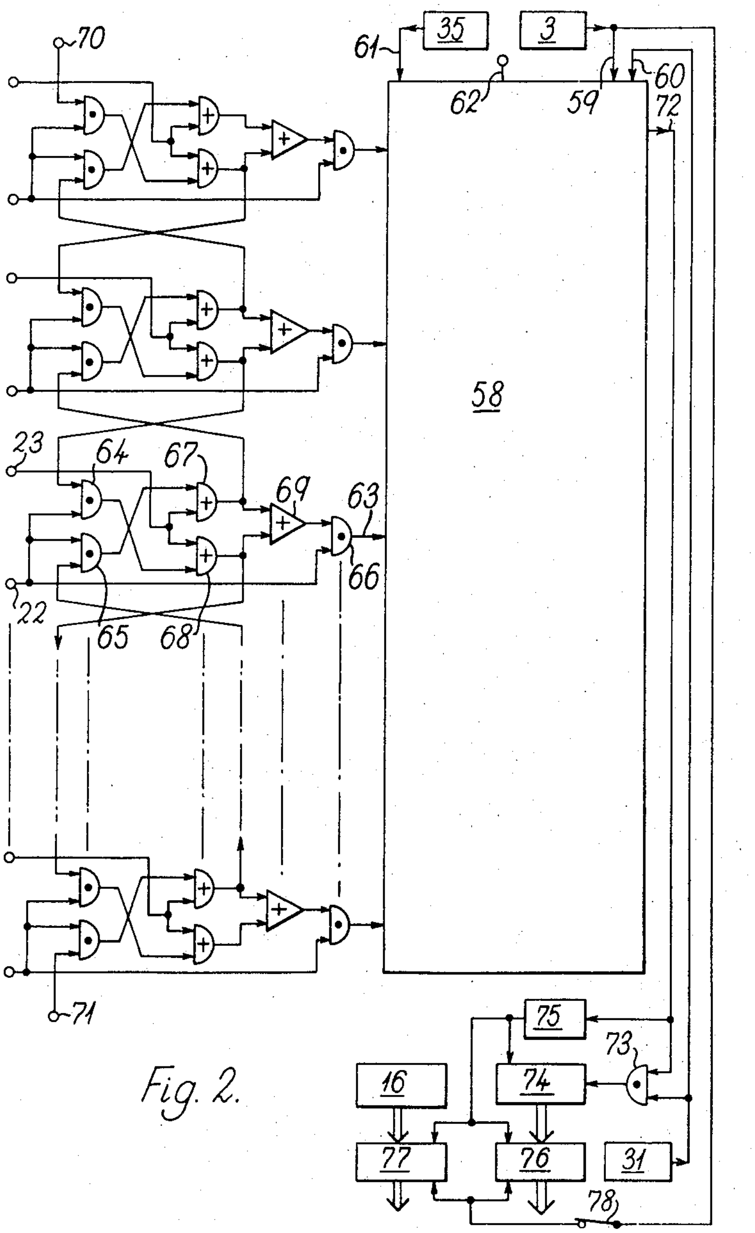
FIG. 2 is a functional diagram of an addition which may be made to the apparatus of FIG. 1.

In certain cases it may be desired to investigate correlation functions exhibiting more than one peak. While this may of course be effected by using the display facility described above, for some applications (for example automatic system testing) it may be convenient to provide a system for automatically identifying the positions and relative heights of the different peaks. FIG. 2 illustrates such a multiple peak detection system which may be added to the apparatus illustrated in FIG. 1. The system comprises a pattern register 58 which is identical in construction to the register 21, except that no provision is made of output lines corresponding to the lines 23 and 26. The outputs of the generators 3, 31 and 35 are respectively applied directly to the clock pulse line 59, the shift pulse line 60 and the mode control line 61 of the register 58, while the serial input line 62 of the register 58 has applied to it a continuous logic O signal. The parallel input lines 63 of the register 58 respectively have applied to them the outputs of a set of R gating circuits which correspond respectively to the stages 2, each gating circuit comprising three AND gates 64, 65 and 66, two OR gates 67 and 68 and a NOR gate 69; for convenience only the first and last three of the gating circuits are shown in the drawing. For each gating circuit, one of the inputs of each of the gates 64, 65 and 66 is connected to the corresponding one of the lines 22, so as to have applied to it the output of the corresponding one of the counters 9, while one input of each of the gates 67 and 68 is connected to the corresponding one of the lines 23, so as to have applied to it the output of the corresponding one of the stages 36. For each of the gating circuits except the last, the second input of the gate 64 has applied to it the output of the gate 68 in the gating circuit next in order above, the second input of the gate 64 in the last of the gating circuits being connected to a terminal 70 to which a continuous logic O signal is applied; similarly, for each of the gating circuits except the first, the second input of the gate 65 has applied to it the output of the gate 67 in the gating circuit next in order below, the second input of the gate 65 in the first of the gating circuits being connected to a terminal 71 to which a continuous logic O signal is applied. For each gating circuit, the outputs of the gates 64 and 65 are respectively applied to the second inputs of the gates 68 and 67, the outputs of which are applied to the inputs of the gate 69, and the output of the gate 69 is applied to the second input of the gate 66, the output of which is applied to the relevant one of the lines 63.

When it is desired to use the multiple peak detection system, the switches 13, 19 and 34 are set as for Mode II operation. The switch 30 is also set as for Mode II operation if it is desired to use the display facility simultaneously, but is otherwise set as for Mode I operation. In the former case it is necessary that the line 25 should be connected to the line 26 so that the respective states of the outputs of the stages 36 will be the same at the beginning of any clock pulse as they were at the end of the preceding clock pulse; in the latter case, the respective states of the outputs of the stages 36 will in any event remain the same throughout each interval between clock pulses. The arrangement of the gating circuits is such that the output of the gate 66 in any given gating circuit will be in the logic 1 state if, and only if, the corresponding one of the counters 9 is in the overload condition and the outputs of both the gates 67 and 68 are in the logic O state; the latter condition will not be satisfied if either the signal appearing on the line 23 corresponding to the given gating circuit is in the logic 1 state or if the signal appearing on the line 23 corresponding to another of the gating circuits is in the logic 1 state and there is between the given gating circuit and that other gating circuit no gating circuit for which the overload condition has not occurred in the corresponding one of the counters 9. Accordingly, at the beginning of any given clock pulse the output of a given one of the gates 66 will be in the logic 1 state if, and only if, the corresponding one of the counters 9 has gone into the overload condition at the end of the preceding clock pulse in consequence of the existence of a peak in the correlation function. For example, in the case illustrated in Table I, the output of the eighth of the gates 66 will be in the logic 1 state at the beginning of the clock pulse $(n + 2)$ as a result of the eighth of the counters 9 going into the overload condition at the end of the clock pulse $(n + 1)$, but at the beginning of the clock pulse $(n + 3)$ the outputs of the seventh, eighth and ninth of the gates 66 will be in the logic 0 state (although the seventh, eighth and ninth of the counters 9 are in the overload condition) because of the inhibiting effect arising from the existence of a logic 1 state on the eighth of the lines 23; the inhibiting effect will spread to more of the gating circuits as more of the counters 9 go into the overload condition, but will not have reached the seventeenth of the gating circuits by the beginning of the clock pulse $(n + 5)$ because of the existence at this time of the logic 0 states on the twelfth to the sixteenth of the lines 22, so that at the beginning of the clock pulse $(n + 5)$ the output of the seventeenth of the gates 66 will be in the logic 1 state.

The operation of the register 58 is similar to that of the register 21 when the apparatus illustrated in FIG. 1 is operating in Mode II, so that at the end of each clock pulse the output of each of the binary storage stages incorporated in the registers 58 will assume the same state as that of the output of the corresponding one of the gates 66 at the beginning of that clock pulse. Thus at the end of any clock pulse following one at the end of which one of the counters 9 has gone into the overload condition in consequence of the existence of a peak in the correlation function, the output of the corresponding one of the stages of the register 58 will assume the logic 1 state, and therefore so will the signal appearing on the common output line 72 of the register 58. During the succeeding interval between clock pulses, the signal appearing on the line 72 will remain in the logic 1 state until the outputs of all the stages of the register 58 have assumed the logic 0 state; this will occur at the end of that one of the R shift pulses occurring during that interval whose number is the same as that of the highest in order of the stages of the register 58 for which the output was in the logic 1 state at the beginning of the interval. At all other times the signal appearing on the line 72 will be in the logic 0 state.

The signal appearing on the line 72 is applied to one input of an AND gate 73, to the other input of which is applied the output of the generator 31, and the output of the gate 73 is applied to the input of a pulse counter 74; it will be appreciated that pulses will be applied to the counter 74 only during those periods when the signal appearing on the line 72 is in the logic 1 state. The signal appearing on the line 72 is also applied to a pulse generator 75 which is operative to generate a short pulse in response to any transition from the logic 1 state to the logic 0 state in this signal. The output of the generator 75 is applied to read-in control terminals of two buffer registers 76 and 77 and to the reset terminal of the counter 74, the arrangement being such that when a pulse appears in the output of the generator 75 the numbers currently registered in the counter 74 and the timing counter 16 are respectively stored temporarily in the registers 76 and 77 and the counter 74 is restored to the zero count condition. The output of the generator 3 may be applied to read-out control terminals of the registers 76 and 77 via a switch 78, which is closed when it is desired to use the multiple peak detection system, so that the occurrence of a clock pulse will cause the reading out from the registers 76 and 77 of any numbers stored in them during the immediately preceding interval between clock pulses; these numbers may for example be transferred to a recording or computing device (not shown).

It will be seen that the detection of a peak in the correlation function, having a position corresponding to a time delay of r/F seconds and a height corresponding to a value H of the correlation co-efficient, will be signalled by the storing in the registers 76 and 77, at an appropriate point in the cycle of operation, of numbers respectively equal to r and $1 + 2N/(H + 1)$. The operation of the system is illustrated in FIG. 5, in which the traces (*f*), (*g*), (*h*) and (*k*) respectively represent, for a case corresponding to the example of Table I, the signals appearing at the output of the eighth of the gates 66 (assuming the switch 30 to be set as for Mode I operation), on the line 72, at the output of the gate 73 and at the output of the generator 75. As will be seen, in this case numbers eight and $(n + 2)$ will be stored respectively in the registers 76 and 77 during the interval between the clock pulses $(n + 2)$ and $(n + 3)$ and will be read out on the occurrence of the clock pulse $(n + 3)$.

It should be noted that in the case of a peak such that two adjacent ones of the counters 9 go into the overload condition simultaneously, the multiple peak detection system will always signal the higher of the corresponding two quantized values of the time delay. The system is of course not capable of detecting two separate peaks of the same height, but this will not normally constitute a serious limitation for many applications. If it were desired to cater for the possibility of detecting two separate peaks of the same height, this could readily be achieved by arranging for the peak position information to be extracted in serial form from the register 58 and to be processed by a somewhat more complex arrangement than that incorporating the components 73 to 76.

It may also be noted that, as an alternative to the delay indicating circuit shown in FIG. 1, it would be possible to provide a time delay identification system by using the components 73 to 76 in conjunction with the signal appearing on the common output line 24 of the register 21; in this case the switches 13, 19 and 34 would be set as for Mode I operation (either synchronous or asynchronous), the switch 30 would be set as for Mode II operation, and a continuous logic 0 signal would be applied to the line 25. With such an arrangement, when a significant peak in the correlation function was detected in a given cycle, a number representing the position of this peak would be stored in the register 76 during the interval between the immediately following intercyclic pulses and would be read out on the occurrence of the second of these pulses.

It will be appreciated that a large part of the apparatus described above, either as illustrated in FIG. 1 alone or with the addition of the system illustrated in FIG. 2, consists of a set of R identical units each comprising one of the stages 2 and a string of components associated with that stage. The apparatus therefore lends itself readily to a modular form of construction in which it is built up by making simple interconnections between appropriate points in modules each comprising a fraction of R such units; each module may also conveniently include some of the components, additional to those in the units, which are required for the complete apparatus. It should be noted that the use of a modular form of construction involves the provision in those units corresponding to the first and last stages 2 of the complete apparatus of a few components which are not strictly necessary for the functioning of the apparatus; this applies for example to the gates 10, 38, 47 and 49 and the stage 46 in the unit corresponding to the first of the stages 2. The standardisation involved in the modular form, however, far outweighs any potential extra cost of these components. It should further be noted that the modular form of construction requires that the quantized values of the time delay should be equally spaced apart, as in the apparatus described above. In the case of flow measurement, this has the disadvantage that, as explained above, the maximum fractional error of the indicated velocity varies inversely with the value of the time delay. This disadvantage could be avoided by modifying the register 1 to cause the increments between successive quantized values of the time delay to vary in an appropriate manner, at the expense of not being able to use the modular form of construction.

Having regard to cost considerations, the use of the modular form is particularly attractive in conjunction with fabrication by large scale integrated circuit techniques. It is for example envisaged that in the current state of the art it would be possible to accommodate on a single semiconductor chip, using a 24 pin package, up to 30 of the identical units of the apparatus illustrated in FIG. 1, together with the components 12, 15 to 18, 42 to 45, 51 and 54.

With slight modifications, the apparatus illustrated in FIGS. 1 and 2 may also be used in ways other than those indicated above. Thus, it is not necessary that the pulses applied to the command inputs of the gates 8 should be synchronous with the pulses operating the register 1; in particular a number of pulses could be applied to the gates 8 during each interval between the pulses operating the register 1, or vice versa. For example if the apparatus illustrated in FIG. 1 was modified so that during each interval between two clock pulses there were applied to the gates 8 a number of pulses proportional to the value of $|A(t)|$ at the time of the earlier of these clock pulses, the numbers registered in the respective counters 9 would be in approximate correspondence with the values of the correlation function $$\frac{1}{T}\int_0^T A(t)\,\frac{B(t-y)}{|B(t-y)|}\,dt$$

for a series of values of $y$. Further, it is not necessary that the signals applied respectively to the input of the register 1 and the commoned inputs of the gates 6 should be derived from noise signals; in particular the latter of these signals could be a continuous logic 1 signal, in which case the state of the output of each inverter 7 would always be the same as that of the output of the corresponding one of the stages 2. With such an arrangement, for example, the signal applied to the input of the register 1 could have a form such that the outputs of the stages 2 would in repeated succession assume the logic 1 state on the application of successive clock pulses, thereby making the inputs of the counters 9 available for the application of pulses in the same repeated succession in successive intervals between clock pulses; if in this case the commoned inputs of the gates 8 were connected in a similar repeated succession to the outputs of a set of R pulse generators respectively operative to generate in the relevant intervals numbers of pulses respectively dependent on the values of different ones of a set of R given variables, the numbers registered in the respective counters 9 would represent the integrated values of these variables over a period. It will be appreciated that where the apparatus is used in one of these alternative ways, it may be necessary also to modify the operation of the control circuit, and particularly the timing counter 16, and the arrangements for extracting information from the register 21; the necessary modifications for any given case will be readily apparent to those skilled in the art.

I claim:

1. A digital data processing apparatus comprising:

a binary shift register having a serial input and comprising a set of serially connected stages;

a set of counters respectively corresponding to different stages of the shift register;

count controlling means connected to said shift register and said counters and operative to cause each counter to count out of a sequence of successive occasions only those occasions on which there occurs in respect of the corresponding stage a given condition whose occurrence or non-occurrence on each of said occasions is dependent on the state of the stage on that occasion; and signalling means connected to said counters and comprising storage means for storing temporarily a binary word the digits of which correspond respectively to said counters and each digit of which has a first value or a second value according to whether or not the count for the corresponding stage has reached a given value; and signal generating means operative in response to the presence in said storage means of a binary word of which at least one of the digits has said first value to generate a signal whose form indicates the ordinal number of at least one stage for which the count has reached said given value.

2. An apparatus according to claim 1, further comprising means for generating a train of regularly recurrent clock pulses, and means for applying the clock pulses to the shift register so as to determine the instants at which the states of its stages can change.

3. An apparatus according to claim 2, in which said count controlling means is operative so that said given condition is the coincidence of the state of the relevant stage with the current state of a binary signal applied to a terminal of the count controlling means.

4. An apparatus according to claim 3, further comprising sampling means operative in response to the application of the clock pulses to generate first and second binary signals respectively corresponding to first and second input signals applied to the sampling means, the state of each binary signal between two consecutive ones of the instants at which the states of stages of the shift register can change being dependent on the polarity of the corresponding input signal at the earlier of these instants, and means for applying said first and second binary signals respectively to the input of the shift register and to said terminal of the gating means.

5. An apparatus according to claim 2, further comprising means for applying the clock pulses to the count controlling means so as to determine the successive occasions of said sequence.

6. An apparatus according to claim 1, further comprising control means operable repeatedly to restore all the counters to a condition of zero count and thereby cause the apparatus to operate in repeated cycles each corresponding to one sequence of occasions.

7. An apparatus according to claim 6, further comprising means operable to cause the control means to operate in response to the reaching of said given value by the count for any of said stages.

8. An apparatus according to Claim 7, in which there is provided means for causing said storage means to take in at the end of each cycle a binary word indicating for which of said stages the count has reached said given value during that cycle, and said signal generating means is operative to generate for each cycle during which the count has reached said given value for any of said stages a signal whose form indicates the ordinal number of only one stage for which the count has reached said given value.

9. An apparatus according to claim 8, in which said signal generating means is operative to generate a train of pulses whose repetition frequency is inversely proportional to the cardinal number corresponding to said ordinal number.

10. An apparatus according to claim 6, further comprising means for causing the control means to operate in response to the elapsing of a given time from a previous operation of the control means.

11. An apparatus according to claim 10, further comprising means operable to terminate said sequence of occasions for any cycle in response to the reaching of said given value by the count for any of said stages before the elapsing of said given time.

12. An apparatus according to Claim 11, in which there is provided means for causing said storage means to take in at the end of each cycle a binary word indicating for which of said stages the count has reached said given value during that cycle, and said signal generating means is operative to generate for each cycle during which the count has reached said given value for any of said stages a signal whose form indicates the ordinal number of only one stage for which the count has reached said given value.

13. An apparatus according to claim 12, in which said signal generating means is operative to generate a train of pulses whose repetition frequency is inversely proportional to the cardinal number corresponding to said ordinal number.

14. An apparatus according to claim 10, in which there is provided means for causing said storage means to take in for each of a sequence of instants in each cycle a binary word indicating for which of said stages the count has reached said given value at that instant, and said signal generating means is operative to generate during each cycle a sequence of signals respectively corresponding to said sequence of instants and each having a form indicating the ordinal number of any and every one of said stages for which the count has reached said given value at the corresponding one of said instants.

15. An apparatus according to Claim 14, further comprising display means operative during each cycle in response to the application of said sequence of signals to provide a display of the information taken into said storage means for at least that part of said sequence of instants for which the count for any of said stages may have reached said given value.

16. A digital data processing apparatus comprising:

a binary shift register having a serial input and comprising a set of serially connected stages;

means for generating a train of regularly recurrent clock pulses;

means for applying the clock pulses to the shift register so as to determine the instants at which the states of its stages can change;

a set of counters respectively corresponding to different stages of the shift register;

gating means operative to cause each counter to count out of a sequence of successive occasions only those occasions on which there occurs in respect of the corresponding stage a coincidence between the state of the stage and the current state of a binary signal applied to a terminal of the gating means;

sampling means operative in response to the application of the clock pulses to generate first and second binary signals respectively corresponding to first and second input signals applied to the sampling means, the state of each binary signal between two consecutive ones of the instants at which the states of stages of the shift register can change being dependent on the polarity of the corresponding input signal at the earlier of these instants;

means for applying said first and second binary signals respectively to the input of the shift register and to said terminal of the gating means;

control means operative repeatedly to restore all the counters to a condition of zero count and thereby cause the apparatus to operate in repeated cycles each corresponding to one sequence of occasions;

means operative to terminate the sequence of occasions for any cycle in response to the reaching of a given value by the count for any of said stages;

a pattern register operative to take in at the end of each cycle information indicating for which of said stages the count has reached said given value during that cycle and to store that information temporarily; and means operative in response to the information stored by the pattern register to generate for each cycle during which the count has reached said given value for any of said stages a signal whose form indicates the ordinal number of a stage for which the count has reached said given value.

17. An apparatus according to claim 16, in which said signal generating means is operative to generate a train of pulses whose repetition frequency is inversely proportional to the cardinal number corresponding to said ordinal number.

18. An apparatus according to claim 17, in which said signal generating means and said clock pulse generating means are operative so that the product of said repetition frequency and said cardinal number is directly proportional to the repetition frequency of the clock pulses.

19. An apparatus according to claim 16, further comprising means for applying the clock pulses to the gating means so as to determine the successive occasions of said sequence for each cycle.

20. A digital data processing apparatus comprising:

a binary shift register having a serial input and comprising a set of serially connected stages;

a set of counters respectively corresponding to different stages of the shift register;

count controlling means connected to said shift register and said counters and operative to cause each counter to count out of a sequence of successive occasions only those occasions on which there occurs in respect of the corresponding stage a given condition whose occurrence or non-occurrence on each of said occasions is dependent on the state of the stage on that occasion;

means for repeatedly restoring all the counters to a condition of zero count and thereby causing the apparatus to operate in repeated cycles;

first storage means for storing temporarily a binary word the digits of which correspond respectively to said counters;

means for operating said first storage means so that it takes in for each of a sequence of instants in each cycle a binary word each digit of which has a first value or a second value according to whether or not the count for the corresponding stage has reached a given value at that instant;

comparison means for comparing first and second binary words the digits of each of which correspond respectively to said counters and for generating a further binary word the digits of which correspond respectively to said counters ane each digit of which has one or other of two values according to whether or not these are satisfied all three conditions that a. the corresponding digit of said first binary word has said first value, b. the corresponding digit of said second binary word has said second value, and c. the position of the digit is separated from any digit position for which the digit of said second binary word has said first value by at least one digit position for which the digit of said first binary word has said second value;

means for causing said comparison means to operate one for each instant of said sequence with said first binary word being the binary word taken in by said first storage means for that instant and with said second binary word being a binary word taken in by said first storage means for the preceding instant of said sequence and subsequently derived from said first storage means;

second storage means for storing temporarily a binary word the digits of which correspond respectively to said counters;

means for operating said second storage means so that it takes in for each instant of said sequence the further binary word generated by the operation of said comparison means for that instant; and signal generating means operative in response to the presence in said second storage means of a binary word of which at least one of the digits has said one of said two values to generate a signal whose form indicates the ordinal number of at least one stage of the shift register corresponding to a digit of that binary word which has said one of said two values.

21. An apparatus according to claim 20, further comprising means for providing information indicating the ordinal number of any instant in said sequence for which the operation of said comparison means generates a further binary word of which at least one of the digits has said one of said two values.

22. A digital data processing apparatus for comparing two binary signals, said apparatus comprising:

a binary shift register having a serial input and comprising a set of serially connected stages;

means for operating said shift register so that it stores temporarily, in respect of each a series of regularly recurrent instants, a binary word the digits of which correspond, in the sequence of said stages, to the states of a first one of the two binary signals at times earlier by successively greater amounts than the relevant one of said series of instants;

means for effecting a sequence of comparison operations in each of which the state of the second of the two binary signals is compared with each of the digits of said binary word;

means for counting the results of the comparisons separately for each digit position of said binary word; and signalling means for generating a signal in response to the reaching of a given value by the count for any one of the digit positions of said binary word, said signalling means comprising means causing the signal to have a form indicating for which of said digit positions the count first reached said given value.

23. An apparatus according to claim 22, further comprising:

means for repeatedly restoring said counting means to a condition of zero count for all digit positions of said binary word and thereby causing the apparatus to operate in repeated cycles; and means for terminating the sequence of comparison operations for any cycle in response to the reaching of said given value by the count for any of the digit positions of said binary word.

24. An apparatus according to claim 22, in which said means for operating said shift register comprises:

means for applying said first one of the two binary signals continuously to said serial input of the shift register;

means for generating a train of regularly recurrent clock pulses; and means for applying the clock pulses to the shift register so as to determine the instants at which the states of its stages can change.

* * * * *